United States Patent
Komatsu et al.

(10) Patent No.: US 6,906,891 B2
(45) Date of Patent: Jun. 14, 2005

(54) FLEXIBLE DISK DRIVE HAVING A FRAME STRUCTURE COMPRISING A MAIN FRAME AND A SUB-FRAME OF A LOWER COVER

(75) Inventors: Hisateru Komatsu, Tendo (JP); Makoto Konno, Tendo (JP); Makoto Takahashi, Obanazawa (JP); Noriyuki Kobayashi, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 275 days.

(21) Appl. No.: 10/385,113

(22) Filed: Mar. 10, 2003

(65) Prior Publication Data

US 2003/0174438 A1 Sep. 18, 2003

(30) Foreign Application Priority Data

Mar. 13, 2002 (JP) ........................................ 2002-068589

(51) Int. Cl.[7] .............................................. G11B 17/02
(52) U.S. Cl. ............................... 360/99.01; 360/99.02; 360/99.04
(58) Field of Search ........................... 360/99.01, 99.02, 360/99.04, 99.08, 97.01

(56) References Cited

U.S. PATENT DOCUMENTS

| | | | | |
|---|---|---|---|---|
| 3,973,274 A | * | 8/1976 | Morgan | 360/99.01 |
| 5,610,782 A | * | 3/1997 | Tomoe et al. | 360/99.04 |
| 5,648,881 A | * | 7/1997 | Yokouchi | 360/99.04 |
| 6,574,071 B2 | * | 6/2003 | Nelson et al. | 360/99.04 |

FOREIGN PATENT DOCUMENTS

| | | |
|---|---|---|
| JP | 9-91859 A | 4/1997 |
| JP | 9-97493 A | 4/1997 |
| JP | 9-97839 A | 4/1997 |
| JP | 2000-245125 A | 9/2000 |
| JP | 2001-184774 A | 6/2001 |
| JP | 2001-178185 A | 7/2001 |
| JP | 2001-190055 A | 7/2001 |

* cited by examiner

Primary Examiner—Robert S. Tupper
(74) Attorney, Agent, or Firm—Frishauf, Holtz, Goodman & Chick, P.C.

(57) ABSTRACT

A main frame has a size where only high precision parts are mounted thereon and has structure where a front portion of a frame is deleted. A lower cover, which covers a lower surface of the main frame, has a function as a sub-frame mounting low precision parts corresponding to the front portion of the deleted frame, thereby playing a role as one frame by a combination of the main frame and the sub-frame of the lower cover.

6 Claims, 18 Drawing Sheets

215  702

21A

703

FLEXIBLE DISK DRIVE HAVING A FRAME STRUCTURE COMPRISING A MAIN FRAME AND A SUB-FRAME OF A LOWER COVER

This application claims priority of prior application JP 2002-68589, the disclosure of which is incorporated herein by reference.

BACKGROUND OF THE INVENTION

This invention relates to a flexible or floppy disk drive and, in particular, to a frame structure therefor.

In the manner which is well known in the art, the flexible disk drive (which may be hereinafter called "FDD" for short) of the type is a device for carrying out data recording and reproducing operation to and from a disk-shaped magnetic recording medium of the flexible disk (which may be hereinafter called "FD" for short or may be called "a medium") loaded therein. In addition, such a flexible disk drive is mounted or loaded in a portable electronic equipment such as a laptop personal computer, a notebook-size personal computer, a notebook-size word processor, or the like.

The flexible disk drive of the type comprises a magnetic head for reading/writing data from/to the magnetic recording medium of the flexible disk, a carriage assembly for supporting the magnetic head at a tip thereof with the magnetic head movably along a predetermined radial direction to the flexible disk, a stepping motor for moving the carriage assembly along the predetermined radial direction, and a spindle motor for rotatably driving the magnetic recording medium with the floppy disk held. The spindle motor is one of direct-drive (DD) motors.

In order to control such a flexible disk drive, an FDD control apparatus is already proposed. By way of example, Japanese Unexamined Patent Publication Tokkai No. Hei 9-97,493 or JP-A 9-97493 discloses, as the FDD control apparatus, one integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. The CTL control circuit may be called a logic circuit. This IC chip is generally implemented by a metal oxide semiconductor (MOS) IC chip where a number of MOS field effect transistors (FETs) are integrated therein.

The FDD control apparatus comprises not only the one IC chip but also +a spindle motor IC chip for controlling drive of the spindle motor. The spindle motor IC chip is implemented by a bipolar IC chip where a number of bipolar transistors are integrated therein.

Now, flexible disk drives have different specifications due to customers or users. The specification defines, for example, drive select 0 or 1, the presence or absence of a special seek function, the presence or absence of an automatic chucking function, a difference of logic for a density out signal, a difference of logic for a mode select signal, 1M mode 250 kbps or 300 kbps, and so on. If development is made of one IC chips which individually satisfy the different specification, a number types of one IC chips must be prepared. In order to avoid this, a one IC chip having a selectable function circuit is already proposed, for example, in Japanese Unexamined Patent Publication Tokkai No. Hei 9-97,839 or JP-A 9-97839 wherein all functions satisfying all specifications are preliminarily incorporated therein and one of the functions is selected in accordance with a particular specification.

In the manner which is well known in the art, the flexible disk driven by the flexible disk drive includes a disk-shaped magnetic recording medium accessed by the magnetic head. The magnetic recording medium has a plurality of tracks on a surface thereof that serve as paths for recording data and that are formed in a concentric circle along a radial direction. The flexible disk has eighty tracks on one side which include the most outer circumference track (which is named "$TR_{00}$") and the most inner circumference track (which is named "$TR_{79}$"). The most outer circumference track $TR_{00}$ is herein called the most end track.

It is necessary to position the magnetic head at a desired track position in a case where the flexible disk is accessed by the magnetic head in the flexible disk drive. For this purpose, the carriage assembly for supporting the magnetic head at the tip thereof must be positioned. Inasmuch as the stepping motor is used as a driving arrangement for driving the carriage assembly, it is possible for the flexible disk drive to easily carry out the positioning of the carriage assembly. In spite of this, it is necessary for the flexible disk drive to detect only the position of the most end track $TR_{00}$ in the magnetic recording medium of the flexible disk loaded therein. In order to detect the position of the most end track $TR_{00}$, the carriage assembly is provided with an interception plate which projects from a base section thereof downwards and a photointerrupter is mounted on a substrate in the vicinity of a main frame opposed to the carriage assembly. For example, see Japanese Unexamined Patent Publication Tokkai No. Hei 9-91,859 or JP-A 9-91859. That is, it is possible to detect that the magnetic head is laid in the position of the most end track TR00 in the magnetic recording medium of the flexible disk because the interception plate intercepts an optical path in the photointerrupter. Such a track position detecting mechanism is called a "00 sensor" in the art.

In the flexible disk drive where the DD (direct-drive) motor such as a spindle motor is used for rotatably driving the flexible disk, an index signal is generated on the basis of operation in periphery of a rotor of the DD motor. More specifically, a single-pole magnetized magnet (e.g. only a north pole is exposed to the outside) is provided with a peripheral side surface of a disk-shaped casing composing the rotor. Such a magnet is called an index detection magnet. In addition, on a main frame on which a stator of the DD motor and so on are mounted, a main printed wiring board on which a predetermined circuit is formed is disposed. A Hall element is located on the main printed wiring board at a predetermined position corresponding to the outside of the rotor. The Hall element is called an index detection Hall element.

Herein, the Hall element is a semiconductor element applying a Hall effect. The Hall effect is a phenomenon where an electric field occurs in a conductor in a y-direction perpendicular to both of an x-direction and a z-direction when the electric current flows in the x-direction in the conductor and when the magnetic field is applied in the z-direction perpendicular to the x-direction. The electric field caused thereby is a Hall electric field and an output of the Hall element in response thereto is a Hall output.

In addition, Hall elements are used not only as the index detection Hall element but also for detecting a position in the rotor of the spindle motor. Such Hall elements are called position detection Hall elements. A spindle motor using the position detection Hall elements is called a Hall motor.

Although the Hall motor requires three position detection Hall elements, in order to omit their position detection Hall elements, proposal is made to a new motor where states of currents flowing in three-phase coils of the stator are switched on the basis of polarity of an electromotive force induced in one of the three-phase coils that is put into a high-impedance state (e.g. see Japanese Unexamined Patent Publication Tokkai No. 2000-245,125 or JP-A 2000-245125).

In the manner which is described above, in prior art, a single-pole magnetized magnet is used as the index detection magnet. It is difficult to obtain a stable generation timing for the index signal. Accordingly, in order to obtain the stable generation timing for the index signal, the present co-inventors already proposes and files an application to use, as the index detection magnet, a double-pole magnetized magnet (that is, one where a south pole and a north pole are put side by side) (see Japanese Unexamined Patent Publication Tokkai No. 2001-190,055 or JP-A 2001-190055).

A conventional flexible disk drive comprises not only a main frame but also a motor frame for mounting the spindle motor for rotatably driving the medium thereon. This is because it is necessary to form a frequency generation pattern for detecting a rotation speed of the spindle motor on a printed wiring board and it is necessary to mount the printed wiring board on the motor frame. Accordingly, the conventional flexible disk drive is disadvantageous in that it requires a lot of parts and the number of processes for assembling increases. In order to resolve this problem, the present assignee have already proposed a method of controlling the rotation speed of the spindle motor without use of the frequency generation pattern (see Japanese Unexamined Patent Publication Tokkai No. 2001-178185 and have already proposed a flexible disk drive comprising a motor frame portion for mounting the spindle motor thereon that is constituted by one piece integrated by the main frame (see Japanese Unexamined Patent Publication No. 2001-184774).

In the manner which will later be described in conjunction with FIGS. 1 through 12, a proposed flexible disk drive comprises a main frame for mounting all of parts thereon. As a result, the proposed flexible disk drive is disadvantageous in that the main frame has a restricted size.

SUMMARY OF THE INVENTION

It is therefore an object of the present invention to provide a flexible disk drive which is capable of cutting down costs of material.

It is another object of the present invention to provide a flexible disk drive of the type described, which is capable of reducing costs of a product.

It is still another object of the present invention to provide a flexible disk drive of the type described, which is capable of decreasing weight of a product.

Other objects of this invention will become clear as the description proceeds.

On describing the gist of an aspect of this invention, it is possible to be understood that a flexible disk drive comprises a main frame in which a flexible disk is inserted and a lower cover for covering a lower surface of the main frame. According to the aspect of this invention, the above-mentioned main frame has a size so as to mount a carriage assembly for holding a magnetic head, a stepping motor for slidably moving the carriage assembly along a predetermined radial direction, and a part substantially corresponding to a half of a spindle motor for rotatably driving the inserted flexible disk. The main frame has structure where a front portion of a frame is deleted. The lower cover has a function as a sub-frame having a function corresponding to the front portion of the deleted frame, thereby playing a role as one frame by a combination of the main frame and the sub-frame of the lower cover.

DESCRIPTION OF THE PREFERRED EMBODIMENT

Figure 1:
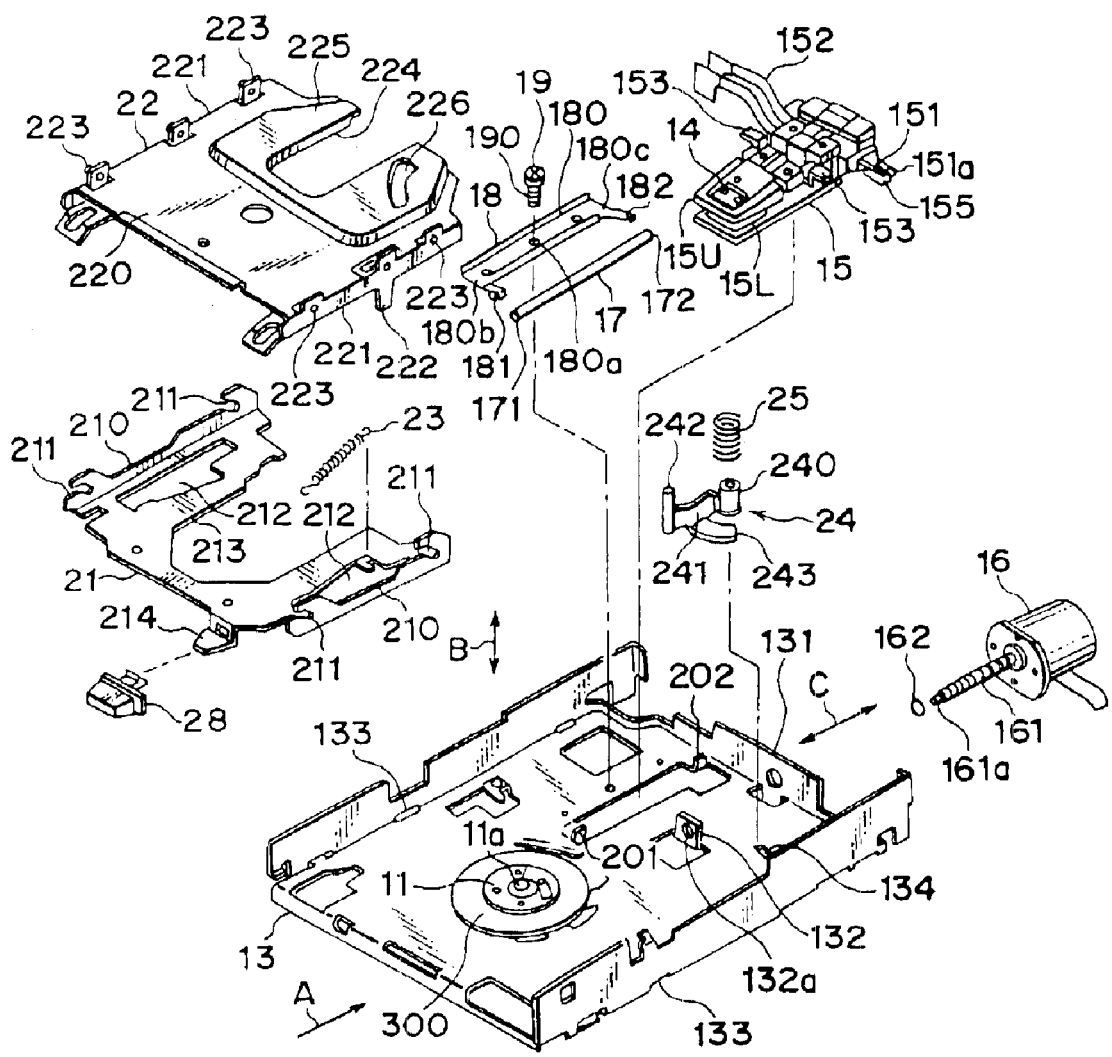
FIG. 1 is an exploded perspective view showing a main part of a conventional flexible disk drive.
Figure 2:
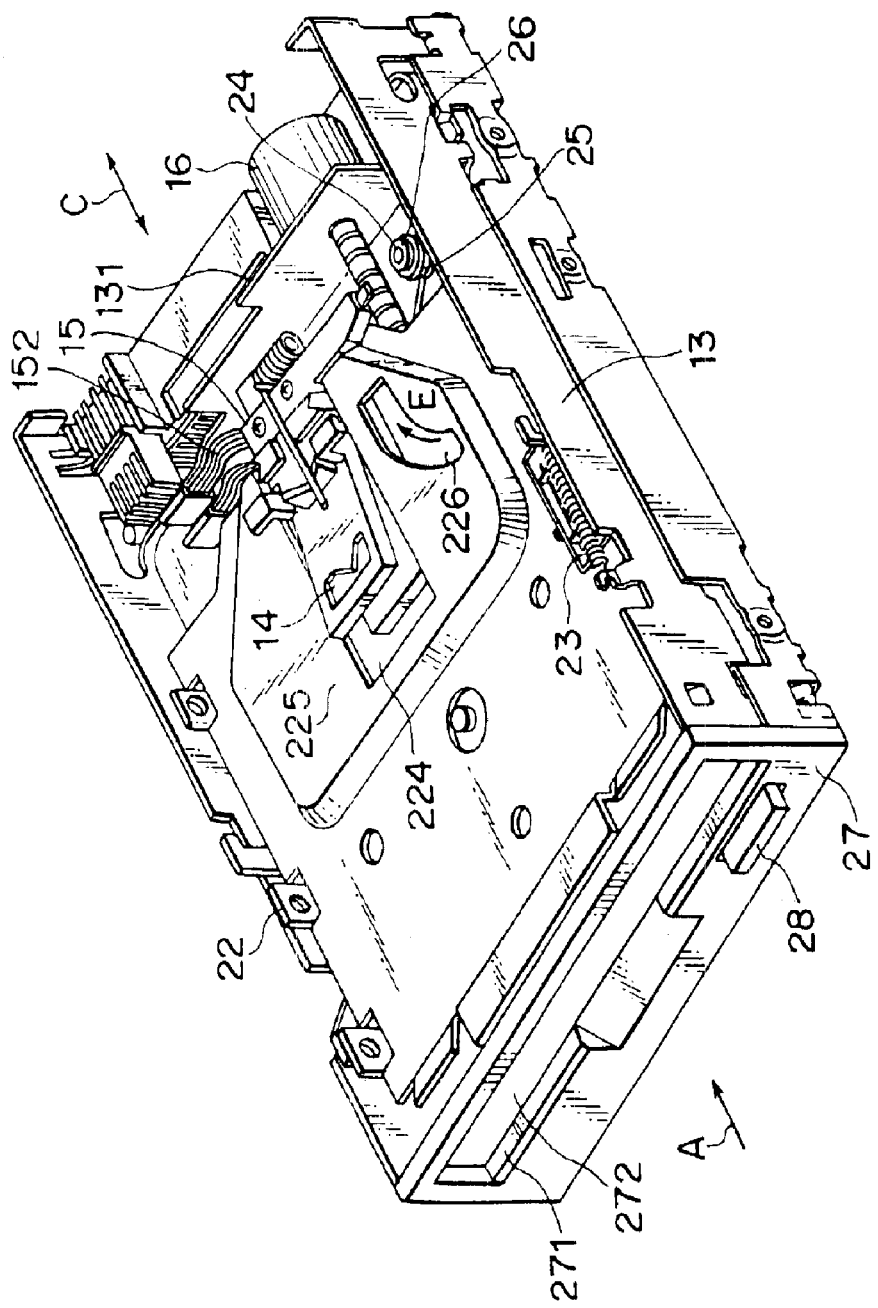
FIG. 2 is a schematic perspective view of the flexible disk drive illustrated in FIG. 1 as view from front obliquely.

Referring to FIGS. 1 and 2, a conventional flexible disk drive of a 3.5-inch type will be described at first in order to facilitate an understanding of the present invention. FIG. 1 is an exploded perspective view of the conventional flexible disk drive. Although the conventional flexible disk drive has a front panel and a case, they are omitted in FIG. 1. FIG. 2 is a perspective view of the conventional flexible disk drive viewing from a front side. An upper cover (the case) is omitted in FIG. 2.

The illustrated flexible disk drive is a device for driving a flexible disk of a 3.5-inch type (which will later be described). The flexible disk is loaded or inserted in the flexible disk drive from a direction indicated by an arrow A in FIGS. 1 and 2. The loaded flexible disk is held on a disk table 11 having a rotation axis 11a. In this event, the rotation axis 11a coincides with a center axis of the flexible disk. In the manner which will later be described, the disk table 11 is rotatably supported on a frame main surface of the main frame 13. Accordingly, the rotation axis 11a of the disk table 11 has an axial direction B which extends in parallel with a thick direction of the main frame 13. The disk table 11 is rotatably driven by a spindle motor or a direct-drive (DD) motor 300, which is mounted on a concave portion of the main frame 13 in the manner which will later be described, thereby a magnetic recording medium of the flexible disk rotates. In addition, on a frame back surface of the main frame 13 is attached a main printed wiring board (not shown) on which a number of electronic parts (not shown) are mounted.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the frame main surface of the main frame 13 and is apart from the main frame 13 in the manner which will later be described. The carriage assembly 15 supports the magnetic heads 14 at the tip thereof movably along a predetermined radial direction (i.e. a direction indicated by an arrow C in FIGS. 1 and 2) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the frame main surface of the main frame 13 by cutting and bending. By the hole 132a and the steel ball 162, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which engages with the root in the male screw of the driving shaft 161. A spring 155 extends from the lower carriage 15L in substantially parallel with the arm 151. That is, the driving shaft 161 of the stepping motor 16 is put between the arm 151 and the spring 155.

Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for linearly moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the frame main surface of the main frame 13. However, because support occurs by the driving shaft 161, it is difficult to dispose the whole of the carriage assembly 15 apart from the frame main surface of the frame 13. For this purpose, a guide bar 17 supports and guides the carriage assembly 15 at another side thereof. The guide bar 17 is opposed to the driving shaft 161 of the stepping motor 16 with the carriage assembly 15 inserted between the guide bar 17 and the driving shaft 161. The guide bar 17 extends in parallel with the predetermined radial direction C and has one end 171 and another end 172 which are mounted on the frame main surface of the main frame 13 in the manner which later be described. The guide bar 17 guides the carriage assembly 15 along the predetermined radial direction C. As a result, the whole of the carriage assembly 15 is disposed apart from the frame main surface of the main frame 13.

In addition, a flexible printed circuit (FPC) 152 extends from the carriage assembly 15 to the vicinity of the guide bar 17 and the flexible printed circuit 152 are electrically connected to the main printed wiring board (which will later be described) attached to the frame back surface of the main frame 13.

The guide bar 17 is clamped on the frame main surface of the main frame 13 by a guide bar clamp 18. The guide bar clamp 18 is fixed on the frame main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 cannot be fixed on the frame main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13.

The lower carriage 15L of the carriage assembly 15 serves as a supporting frame for supporting the carriage assembly 15 slidably along the guide bar 17. The lower carriage 15L has a projecting portion (not shown) which projects into the frame main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed by performing bending, press working, and bending of a metal plate.

The eject plate 21 is mounted on the frame main surface of the main frame 13 slidably along the insertion direction A of the flexible disk and an opposite direction. In the manner which will later become clear, the eject plate 21 holds, in cooperation with the disk holder 22, the flexible disk on operating of the flexible disk drive. In addition, the eject plate 21 holds the flexible disk slidably along in the insertion direction A so as to allow the flexible disk drive to load the flexible disk therein along the insertion direction A and to allow the flexible disk drive to eject the flexible disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will later be described, in a state where the flexible disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the frame main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counter-clockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
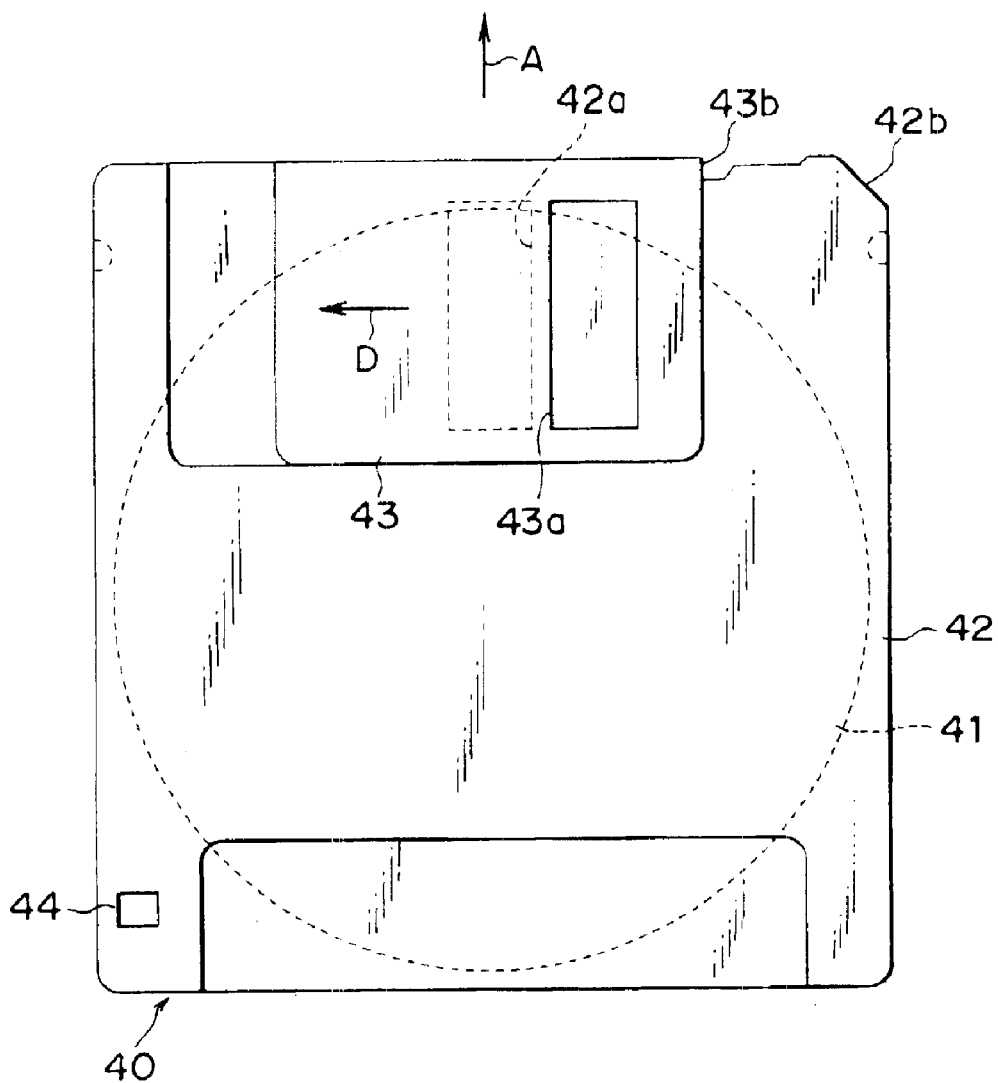
FIG. 3 is a plan view showing a flexible disk driven by the flexible disk drive.

Referring to FIG. 3, the description will proceed to the flexible disk (FD) driven by the flexible disk drive (FDD) illustrated in FIGS. 1 and 2. The illustrated flexible disk depicted at 40 comprises a disk-shaped magnetic recording medium 41, a shell 42 for covering or receiving the magnetic recording medium 41, and the shutter depicted at 43 slidably in a direction indicated by an arrow D in FIG. 3. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 1 and 2) of the flexible disk drive. In a state where the flexible disk 40 is not loaded in the flexible disk drive, the head window 43a is covered by the shutter 43 as shown in FIG. 3. When the flexible disk 40 is loaded in the flexible disk drive, the projection part 242 of the eject lever 42 (FIG. 1) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 3.

As described above, in the flexible disk 40 driven by the flexible disk drive, the magnetic recording medium 41 accessed by the magnetic heads 14 (FIGS. 1 and 2) has a plurality of tracks on a surface thereof that serve as paths for recording data and that are formed in a concentric circle along a radial direction. The flexible disk 40 has eighty tracks one side which include the most outer circumference track (the most end track) $TR_{00}$ and the most inner circumference track $TR_{79}$.

Figure 4:
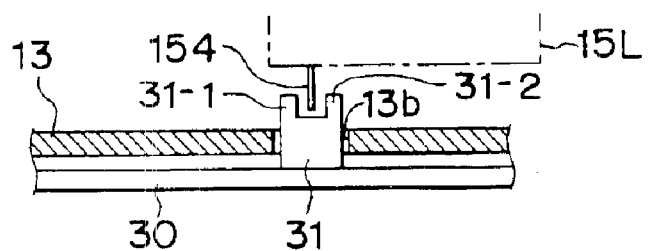
FIG. 4 is a sectional view for use in describing a set-up structure of a track position detecting mechanism (00 sensor) used in the flexible disk drive.

Referring to FIG. 4 in addition to FIG. 1, the description will proceed to a track position detecting mechanism (a 00 sensor) for detecting a position of the most end track TR00 of the magnetic recording medium 41.

In the carriage assembly 15, the lower carriage 15L is provided with an interception plate 154 which projects from a base section thereof downwards. On the other hand, the main printed wiring board 30 is disposed on the frame back surface of the main frame 13 opposed to the carriage assembly 15. On the main printed wiring board 30, a photointerrupter 31, which is used as the track position detecting mechanism (the 00 sensor), is mounted. For this purpose, the main frame 13 has a bore 13b in which the photointerrupter 31 is inserted.

In the manner which is well known in the art, the photointerrupter 31 comprises a first protrusion section 31-1 into which a light-emitting element (which will later be described) is built and a second protrusion section 31-2 into which a light-receiving element (which will later be described) is built. The first protrusion section 31-1 and the second protrusion section 31-2 are opposed to each other at two opposite wall surfaces which have two opening sections (not shown), as shown in FIG. 4. Through the two opening sections, an optical path is formed to go from the light-emitting element to the light-receiving element. In addition, the above-mentioned interception plate 154 passes through a path between the first protrusion section 31-1 and the second protrusion section 31-2.

In the 00 sensor with such a structure, it is possible to detect that the magnetic heads 14 (FIGS. 1 and 2) are laid in the position of the most end track $TR_{00}$ in the magnetic recording medium 41 of the flexible disk 40 because the interception plate 154 intercepts the optical path in the photointerrupter 31.

Figure 5:
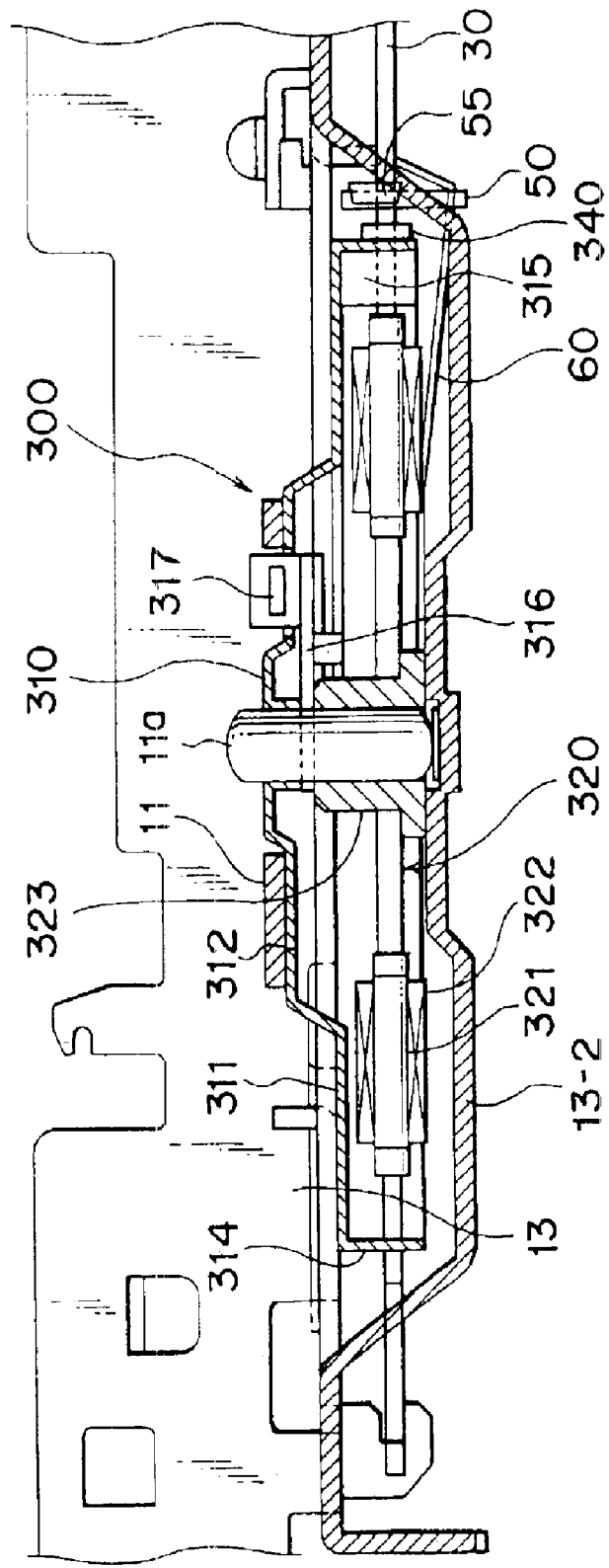
FIG. 5 is a sectional view showing a relationship between a main frame and a direct-drive motor (spindle motor) mounted thereon in the flexible disk drive illustrated in FIG. 1.

Referring now to FIG. 5, the description will proceed to the DD motor (spindle motor) 300 for use in the above-mentioned flexible disk drive.

The illustrated DD motor 300 comprises a rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted.

The rotation axis or shaft 11a made of metal is integrally fixed to the rotor 310 at the center thereof to pass through the casing 311 and the disk table 11. When the disk table 11 is injection-molded by the use of a plastic magnet, the casing 311 and the rotation shaft 11a are integrally assembled. The casing 311 has a cylindrical member 314 formed on its outer periphery to extend downward. A ring-shaped permanent magnet 315 is attached to an inner surface of the cylindrical member 314.

The permanent magnet 315 has a plurality of main magnetized elements along a circumferential direction thereof. The main magnetized elements are called driving magnetized portions.

In addition, as shown in FIG. 5, an index detection magnet 340 is put on an outer circumferential wall of the cylindrical member 314 at a predetermined position.

The protruding portion 312 is provided with an arm 316 attached to a bottom surface thereof. A drive roller 317 is rotatably mounted on the arm 316. Each of the protruding portion 312 and the disk table 11 has a generally rectangular hole formed therein. Through these holes, the drive roller 317 projects upward from the disk table 11. The flexible disk 40 (FIG. 3) received in the flexible disk drive is placed on the disk table 11. The drive roller 317 is inserted in and engaged with a hole (not shown) formed in a hub (not shown) of the flexible disk 40. Thus, the magnetic disk medium 41 (FIG. 3) is rotated following the rotation of the rotor 310.

On the other hand, the stator 320 is attached to a motor frame part 13-2 of the main frame 13 in the manner which will later be described. The stator 320 comprises a core assembly having a plurality of stator cores 321, a plurality of stator coils 322, and a center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the DD motor 300 and rotatably supports the rotation shaft 11a.

Figure 6:
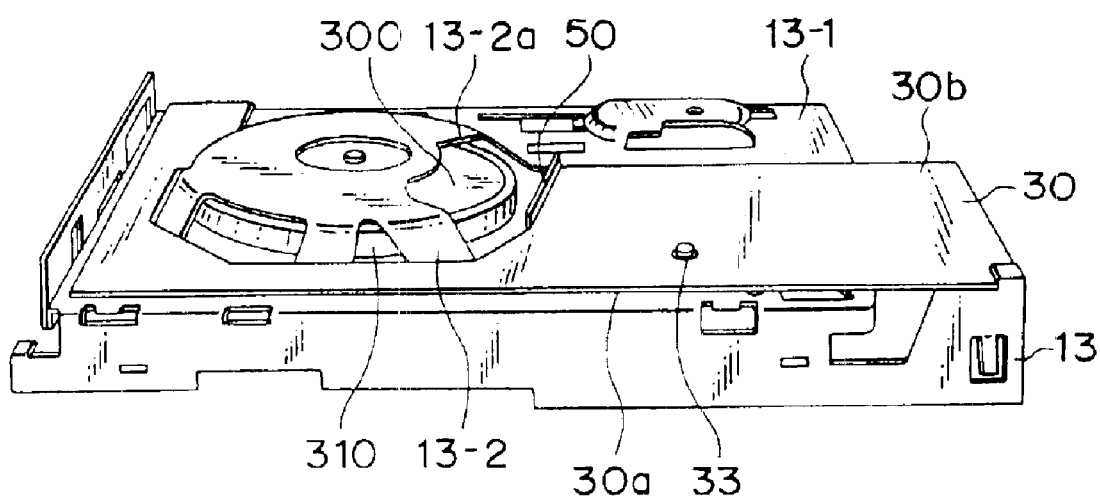
FIG. 6 is a schematic perspective view of a state where a main printed wiring board and a sub printed wiring board are mounted on a main frame for use in the conventional flexible disk drive as seen from the obliquely lower lateral side.

Referring to FIG. 6, the description will proceed to a frame structure (the main frame) 13 for use in the flexible disk drive illustrated in FIGS. 1 and 2. FIG. 6 is a schematic perspective view of the main frame 13 as view from lower side obliquely.

In the manner as apparent from FIG. 6, the illustrated main frame (frame structure) 13 is composed of one piece in which the main frame part 13-1 and a motor frame part 13-2 are integrated. The main frame part 13-1 is made of magnetic material. The flexible disk 40 (FIG. 3) is inserted or loaded in the main frame part 13-1. The spindle motor 300 for rotatably driving the inserted flexible disk is mounted on the motor frame part 13-2. That is, the main frame 13 serves both as an original main frame and an original motor frame.

The motor frame part 13-2 has a drawn-shape obtained by drawing the main frame 13. The motor frame part 13-2 protrudes into the back side of the main frame 13 to form a top surface which is a part of the frame back surface of the main frame 13. In the top surface of the motor frame part 13-2, an opening window 13-2a for drawing out leads of the spindle motor 300 is formed.

In addition, although the drawn-shape of the motor frame part 13-2 illustrated in FIG. 6 is a circular shape, it is not restricted to this and may be a polygonal shape or an oval shape in response to depth or material of the motor frame part 13-2. In addition, a drawing shirked shape in the drawn-shape of the motor frame part 13-2 is also not restricted to that illustrated in FIG. 6 and may be various shapes. Furthermore, a connection way between the motor frame part 13-2 and the main frame part 13-1 is also not restricted to that illustrated in FIG. 6.

The illustrated flexible disk drive can adopt the main frame 13 having the above-mentioned shape because the flexible disk drive does not have a frequency generation pattern which is necessary to control driving of the spindle motor 300 and a printed wiring board on which the frequency generation pattern is formed. Moreover, motor-servo magnetized elements formed at the bottom portion of the permanent magnet 315 of the rotor 310 are unnecessary because the flexible disk drive does not have the frequency generation pattern. Instead, the flexible disk drive comprises an electronic processing unit which functions as a combination of the frequency generation pattern and the motor-servo magnetized elements. Operation of the electronic processing unit is similar to that described in the above-mentioned Japanese Unexamined Patent Publication Tokkai No. 2001-178,185 or JP-A 2001-178185. Inasmuch as the electronic processing unit only indirectly relates to this invention, the description thereof is omitted herein.

The main printed wiring board 30 of the illustrated flexible disk drive is attached to the frame back surface of the main frame part 13-1 of the main frame 13. As shown in FIG. 6, the main printed wiring board 30 has a shape such as to avoid overlapping with the motor frame part 13-2. The main frame part 13-1 has a supporting piece (not shown) which is raised from the frame back surface of the main frame part 13-1 by cutting and bending and which has a threaded hole formed in its tip portion. The main printed wiring board 30 is fixed to the supporting piece by a screw 33 engaged with the threaded hole so that a main surface 30a of the main printed wiring board 30 is spaced at a predetermined distance from the frame back surface of the main frame part 13-1 and a back surface 30b of the main printed wiring board 30 is nearer to the frame back surface of the main frame part 13-1 than the top surface of the motor frame part 13-2.

Figure 7:
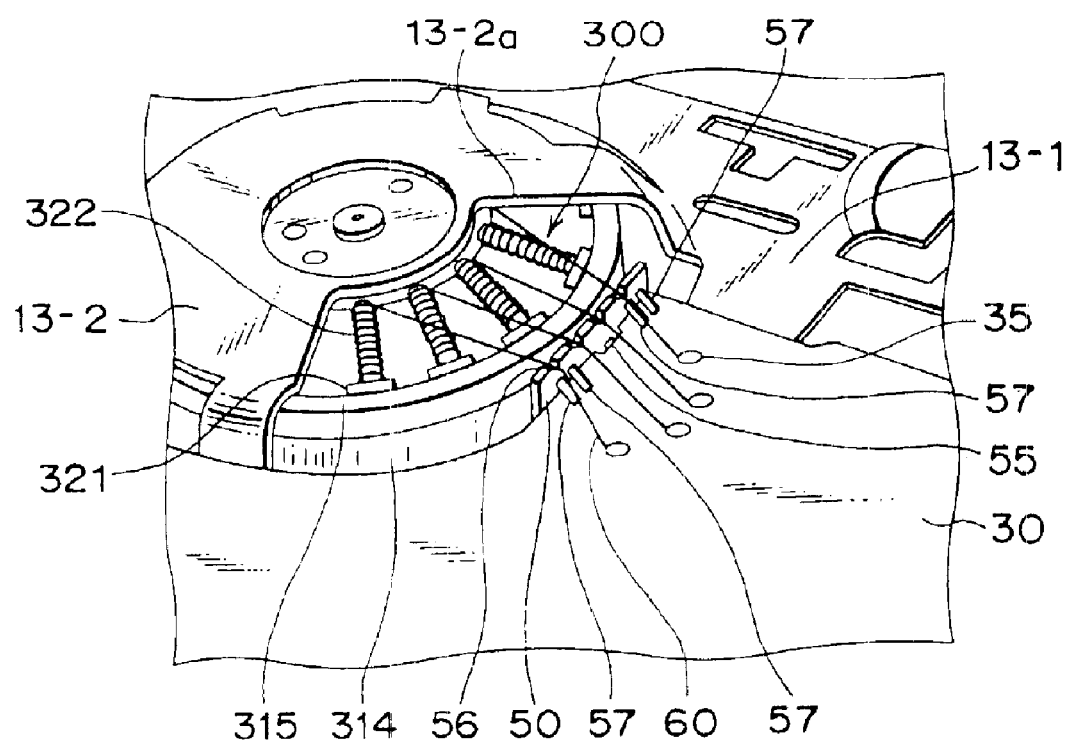
FIG. 7 is a view showing a state where leads are put on ditches of sub printed wiring board illustrated in FIG. 6.

Referring to FIG. 7 in addition to FIG. 6, on the side of the frame main surface of the main frame 13, end portions (i.e. leads) of rotor coils wound around stator cores of the spindle motor 300 mounted on the motor frame part 13-2 are drawn out to the back side of the main frame 13 through the opening window 13-2a formed in the motor frame part 13-2 and are connected to predetermined terminals on the main printed wiring board 30. Generally, the leads 60 are equal in number to four. Three of the leads 60 correspond to U, V and W phases of the three-phase alternating current. The remaining one of the leads 60 is connected to the other ends of the leads of the U, V and W phases. The illustrated flexible disk drive further comprises a sub printed wiring board (a sub circuit board) 50. The sub printed wiring board 50 is for guiding the leads 60. On the sub printed wiring board 50, an index detection Hall element 55 is mounted.

The main printed wiring board 30 extends in a direction perpendicular to the rotation axis 11a of the spindle motor 300. On the other hand, the sub printed wiring board 50 is attached to the main printed wiring board 30 at a position close to an external peripheral side of the rotor 310 of the spindle motor 300 so as to extend in a direction in parallel with the rotation axis 11a of the spindle motor 300.

In addition, the index detection Hall element 55 is attached on the sub printed wiring board 50 so that a magnetic field detection surface thereof is opposed to the external peripheral side surface of the rotor 310. In addition, the index detection Hall element 55 has four terminals (not shown) which are electrically connected to wiring (not shown) in the main printed wiring board 30 via solder 57. The solder 57 plays not only a role of such an electrically connection but also a role of a mechanical connection between the main printed wiring board 30 and the sub printed wiring board 50.

Drawn out from the opening window 13-2a, the leads 60 are held and fixed on the sub printed wiring board 50 with the leads 60 put on ditches 56 of the sub printed wiring board 50. The leads 60 have tips which are connected and fixed to predetermined terminals 35 of the main printed wiring board 30.

Figure 8:
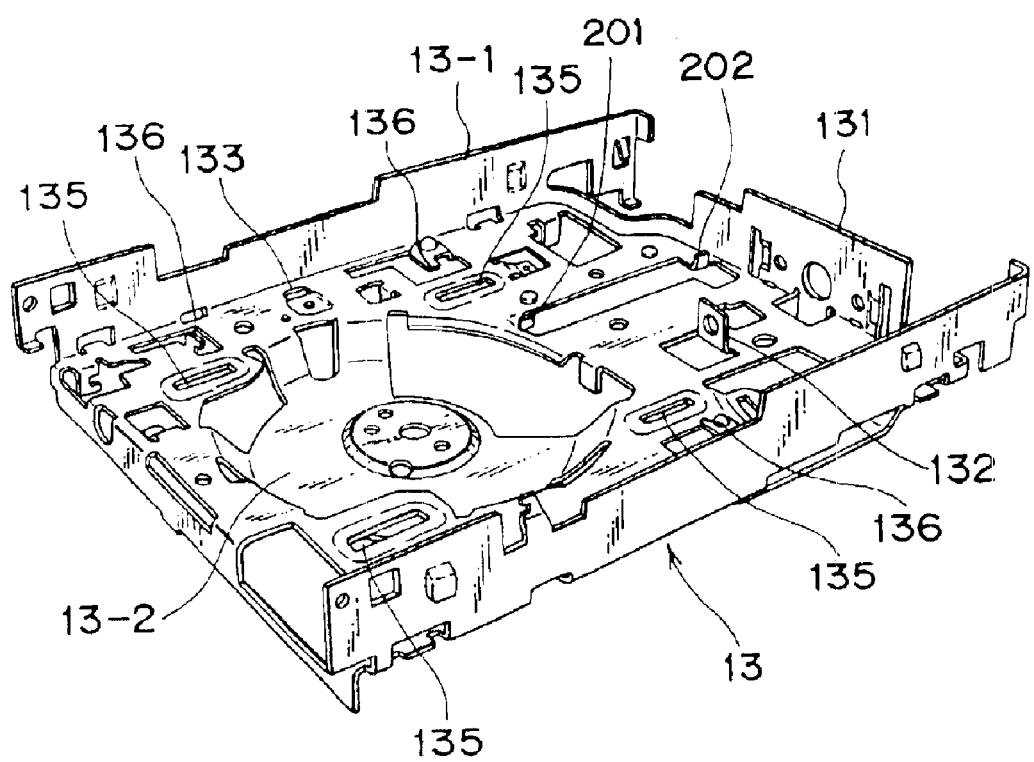
FIG. 8 is a perspective view of a main frame for use in the conventional flexible disk drive illustrated in FIG. 1.
Figure 9:
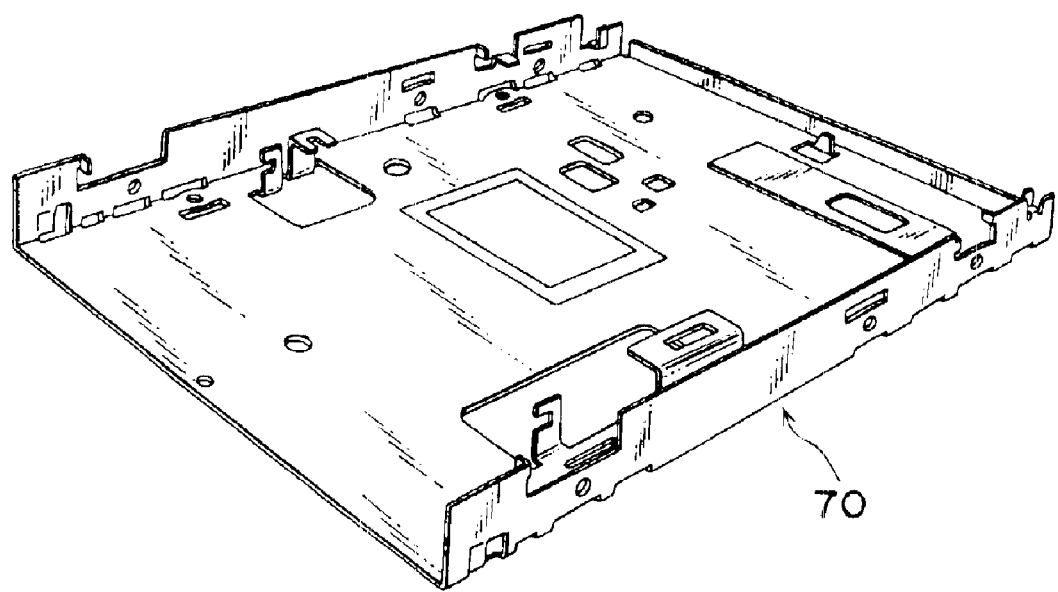
FIG. 9 is a perspective view of a lower cover for covering a lower surface (a bottom surface) of the main frame illustrated in FIG. 8.
Figure 10:
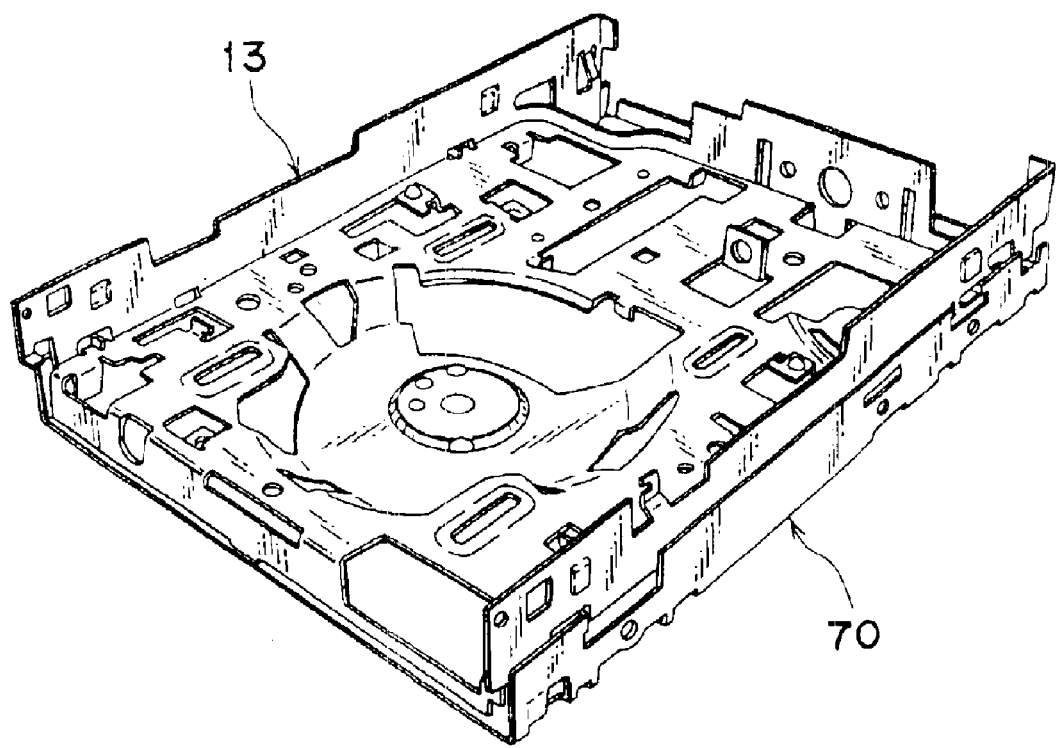
FIG. 10 is a perspective view showing a state where the main frame illustrated in FIG. 8 and the lower cover illustrated in FIG. 9 are combined with each other.

Referring now to FIGS. 8 through 10, the description will proceed to the frame structure of the above-mentioned conventional flexible disk drive. FIG. 8 is a perspective view of the main frame 13 for use in the conventional flexible disk drive. FIG. 9 is a perspective view of a lower cover 70 for covering a lower surface (a bottom surface) of the main frame 13 illustrated in FIG. 8. FIG. 10 is a perspective view showing a state where the main frame 13 illustrated in FIG. 8 and the lower cover 70 illustrated in FIG. 9 are combined with each other.

In the conventional flexible disk drive, the main frame 13 has a restricted size due to spaces of the medium 40 (FIG. 3), the carriage assembly 15, an I/F connector, and so on. That is, on the main frame 13, all of the carriage assembly 15, the stepping motor 16, the spindle motor 300, an eject mechanism portion, the printed wiring board, an exterior part fitting structure and so on are mounted. Accordingly, a size of the main frame 13 serving as a base requires a size to cover the whole of a product of the flexible disk drive. For instance, the conventional main frame 13 has the size 150 by 100 by 20 millimeters. In addition, the main frame 13 has a thickness of 1 millimeter.

In a case of reducing costs in a design stage, a reduction of material costs is made by reducing development of the material. However, in this event, it is impossible to make the main frame 13 smaller caused by spatial problems of the above-mentioned parts. In addition, a reception of the medium 40 after chucking the medium 40 is carried out by a shape of the main frame 13. As a result, the size of the main frame 13 is restricted.

The conventional lower cover 70 has only a function for covering the lower surface of the main frame 13 wholly.

Figure 11:
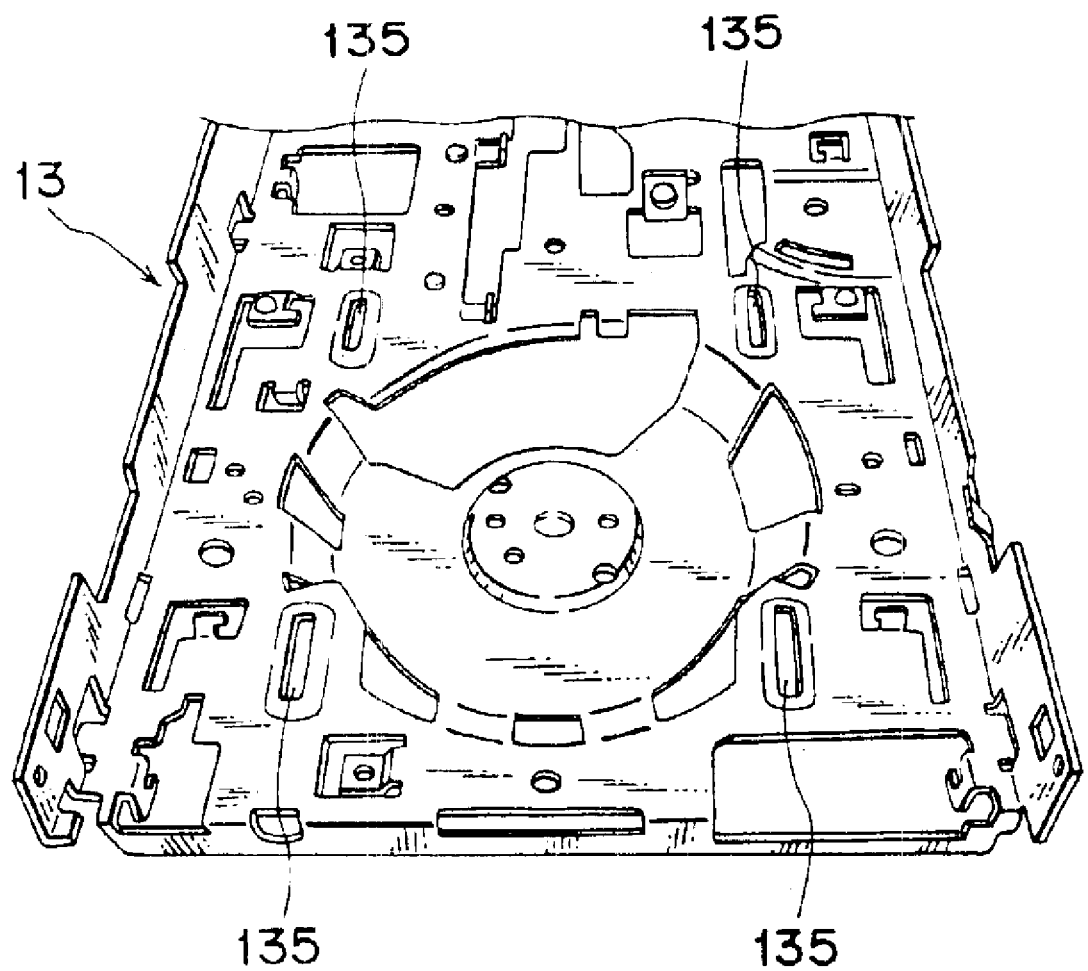
FIG. 11 is a perspective view of the main frame illustrated in FIG. 8 as view from upper side obliquely.

As shown in FIG. 11, the main frame 13 has four concave portions 135 for slidably disposing the eject plate 21 thereon. As a result, warp and deformation of the eject plate 21 do not occur due to shock or the like.

Figure 12:
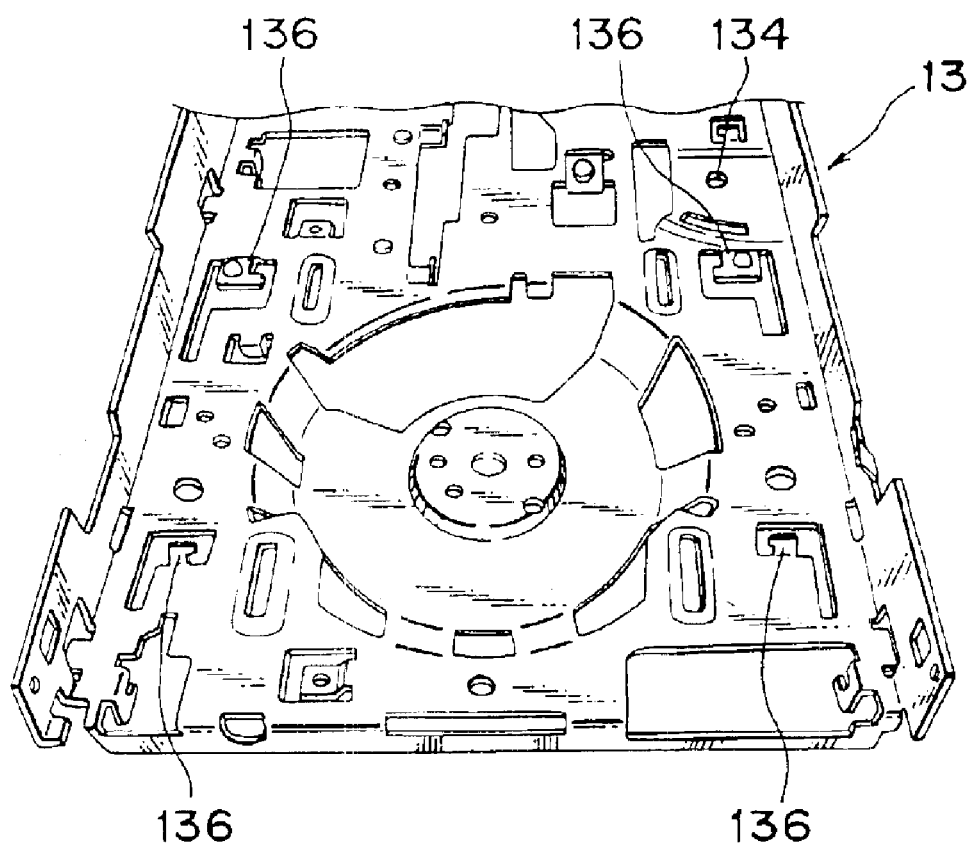
FIG. 12 is a perspective view of the main frame illustrated in FIG. 8 as view from upper side obliquely.

Furthermore, as shown in FIG. 12, all of slide guides of the eject mechanism are included in the main frame 13. In other words, the main frame 13 comprises four slide guides 136 having structure matched with the shape of the eject plate 21 which slidably operates.

Figure 13:
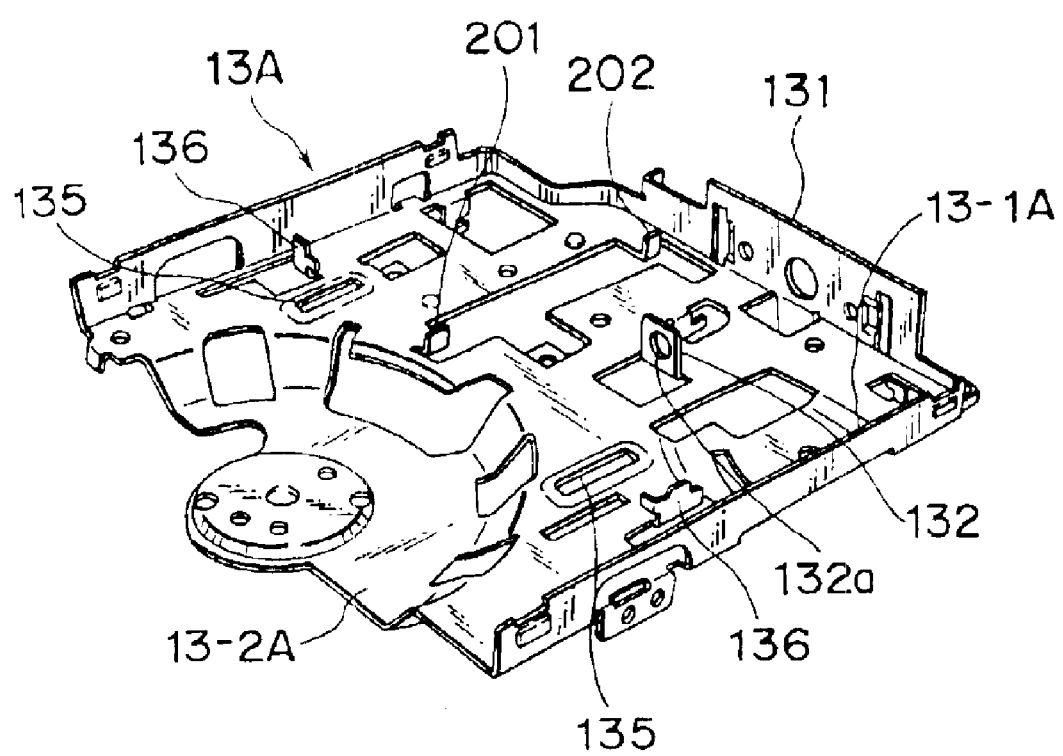
FIG. 13 is a perspective view of a main frame for use in a flexible disk drive according to an embodiment of this invention.
Figure 14:
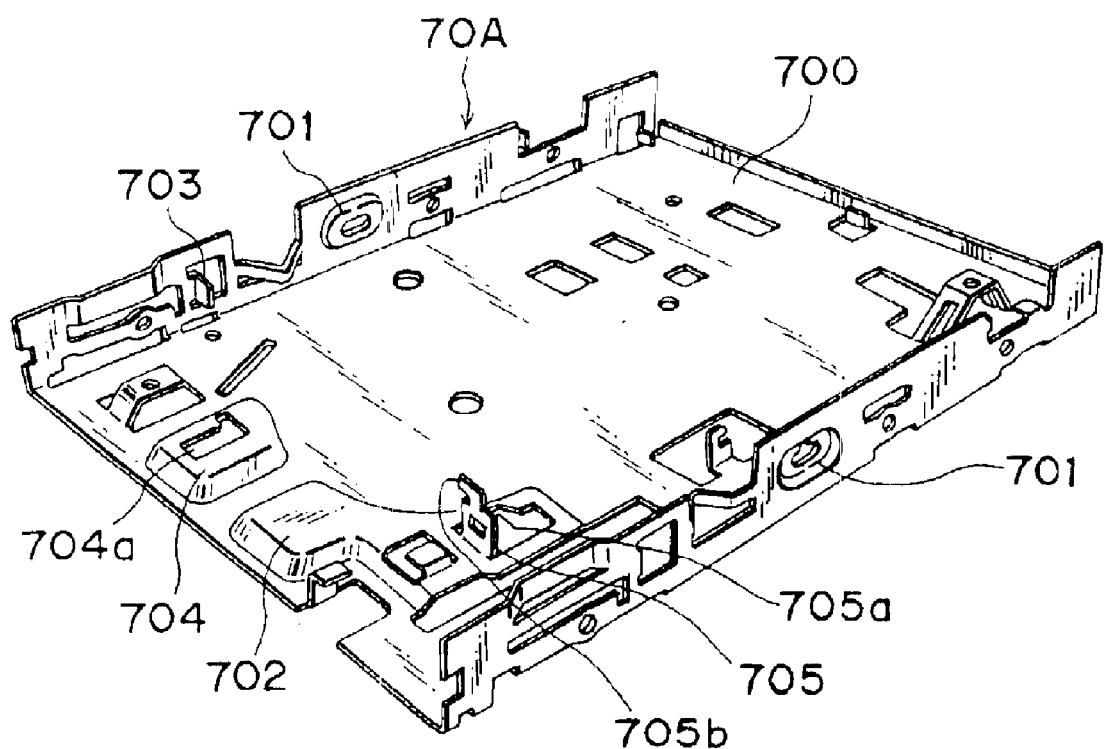
FIG. 14 is a perspective view of a lower cover for covering a lower surface (a bottom surface) of the main frame illustrated in FIG. 13.
Figure 15:
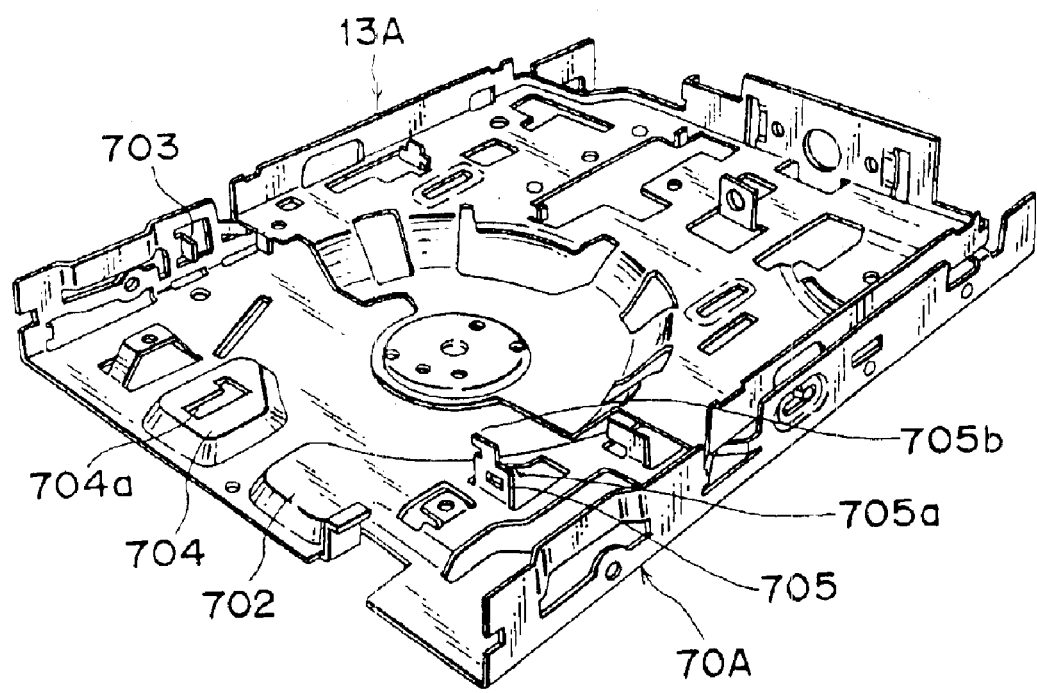
FIG. 15 is a perspective view showing a state where the main frame illustrated in FIG. 13 and the lower cover illustrated in FIG. 14 are combined with each other.

Referring to FIGS. 13 through 15, the description will proceed to a frame structure of a flexible disk drive according to an embodiment of this invention. FIG. 13 is a perspective view of a main frame 13A for use in the flexible disk drive according to the embodiment of this invention. FIG. 14 is a perspective view of a lower cover 70A for covering a lower surface (a bottom surface) of the main frame 13A illustrated in FIG. 13. FIG. 15 is a perspective view showing a state where the main frame 13A illustrated in FIG. 13 and the lower cover 70A illustrated in FIG. 14 are combined with each other.

As is apparent from FIG. 13, the illustrated main frame 13A has a size so as to mount the carriage assembly 15 (FIG. 1) for holding the magnetic head 14 (FIG. 1), the stepping motor 16 (FIG. 1) for slidably moving the carriage assembly 15 along the predetermined radial direction, and a part substantially corresponding to a half of the spindle motor 500 (FIG. 5) for rotatably driving the inserted flexible disk 40 (FIG. 3). That is, the main frame 13A has structure where a front portion of a frame is deleted.

The carriage assembly 15, the stepping motor 16, the spindle motor 300, and so on are parts in which relatively high precision is required on bringing a function (keeping a characteristic) of the flexible disk drive among parts constituting the flexible disk drive. Such parts are called high precision parts. In the embodiment of this invention, such high precision parts are mounted on the main frame 13A.

Inasmuch as structure of a front portion (a part of the front panel 27 side from a center part of the motor frame part 13-2A) of the frame is deleted from the main frame 13A, development of material has little and it is possible to reduce costs of the material. The illustrated main frame 13A has a size about 80 by 100 by 10 millimeters. That is, in comparison with the conventional main frame 13 (FIG. 8), the main frame 13A according to the embodiment of this invention has about half size longitudinally and up and down. In addition, the main frame 13A has both sides of a lower height and has a thickness of 0.8 millimeters rather than 1 millimeter in the conventional main frame 13. It is therefore possible to reduce costs of material.

Inasmuch as the structure of the front portion of the frame is deleted from the main frame 13A, it is necessary to supplement this portion with any means. Therefore, according to this invention, the lower cover 70A has a function as a sub-frame having a function corresponding to the front portion of the deleted frame in the manner which will later be described. The function corresponding the front portion of the deleted frame may a slide guide structure portion of the eject mechanism. The slide guide structure portion of the eject mechanism is a part in which relatively low precision may be on bringing a function (keeping a characteristic) of the flexible disk drive among the parts constituting the flexible disk drive. Such a part is called a low precision part.

Figure 16:
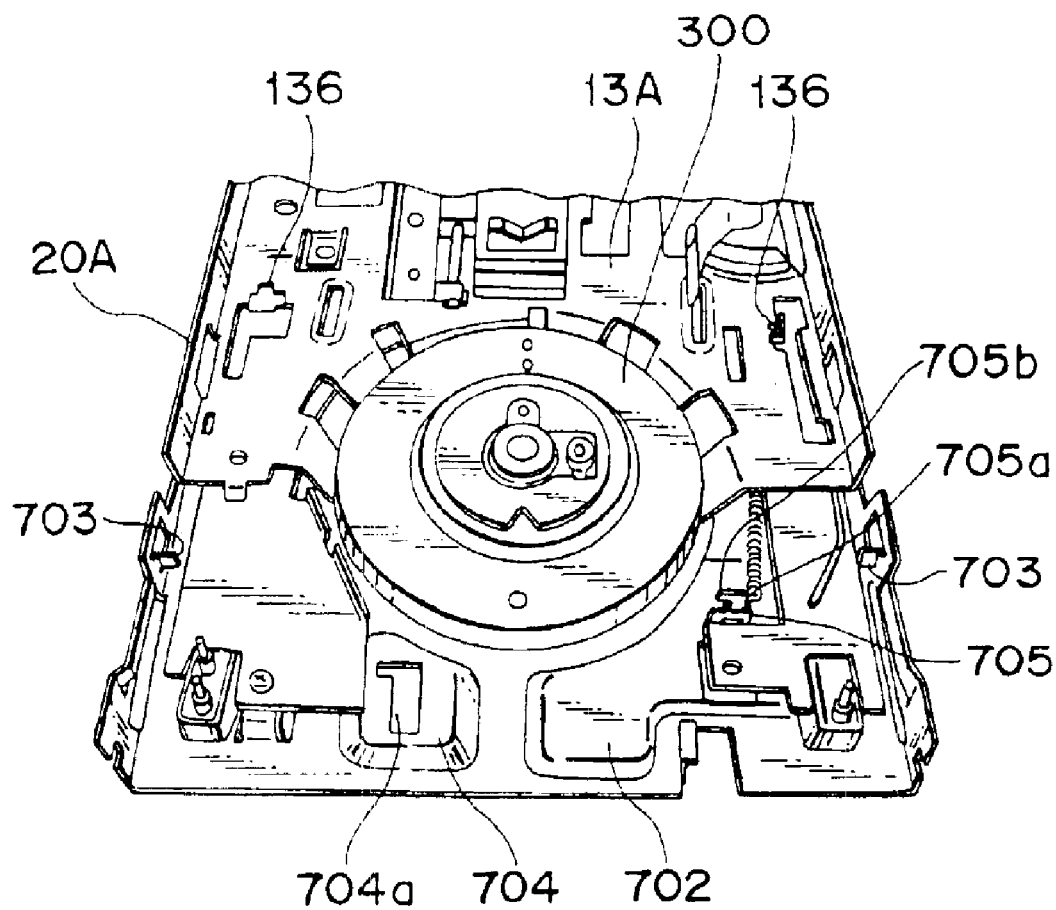
FIG. 16 is a perspective view showing a state where a spindle motor and so on are assembled in a state of FIG. 15 as view from upper side obliquely.
Figure 17:
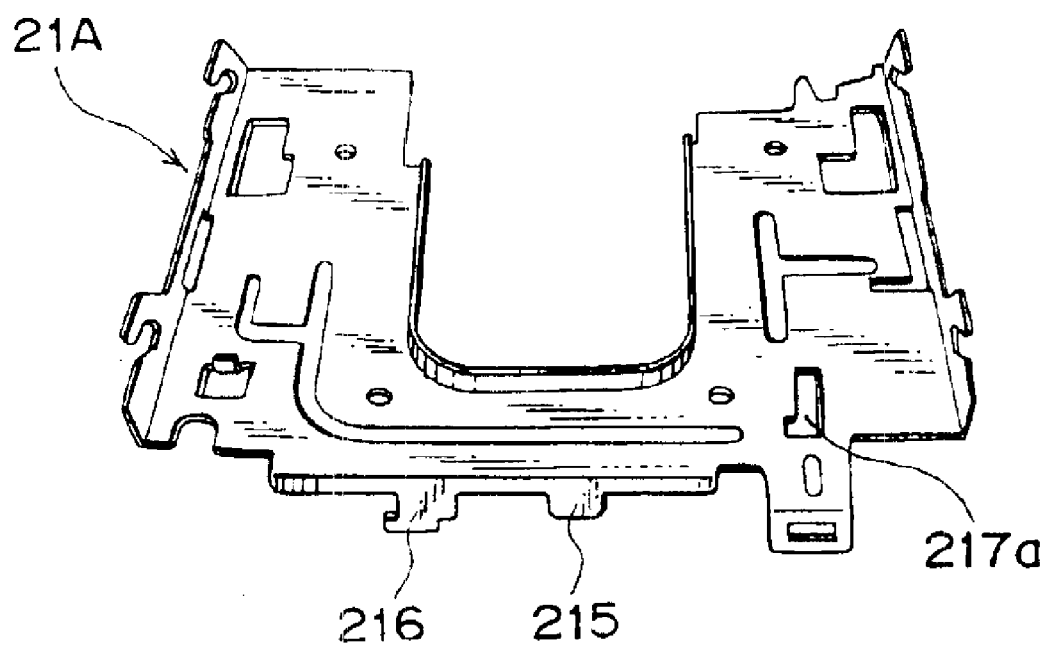
FIG. 17 is a perspective view of an eject plate slidably held on the main frame illustrated in FIG. 13 as view from upper side obliquely.

Referring to FIGS. 16 and 17, the eject plate depicted at 21A is slidably held on the main frame 13A. Inasmuch as the structure of the front portion of the frame is deleted from the main frame 13A in the manner which is described above, it is difficult to prevent warp and deformation of the eject plate 21A from occurring due to shock or the like if merely the eject plate 21A is disposed on the main frame 13A. Accordingly, in this invention, a device for preventing an eject operation from malfunctioning caused by deformation of the eject plate 21A is carried out to the lower cover 70A serving as the sub-frame and the eject plate 21A in the manner which will later be described.

Figure 18:
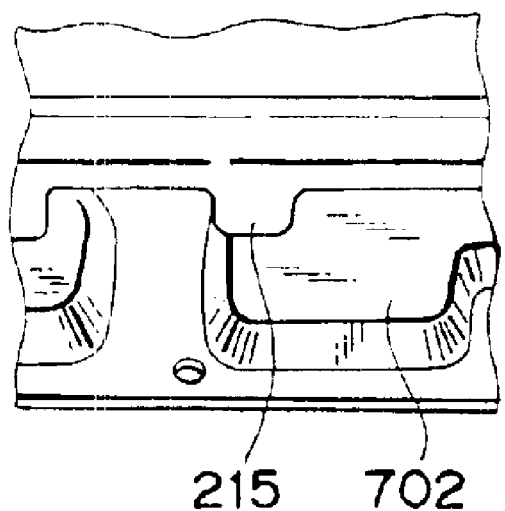
FIG. 18 is a perspective view showing a main part of a state where the eject plate illustrated in FIG. 17 is assembled to the lower cover illustrated in FIG. 14.
Figure 19:
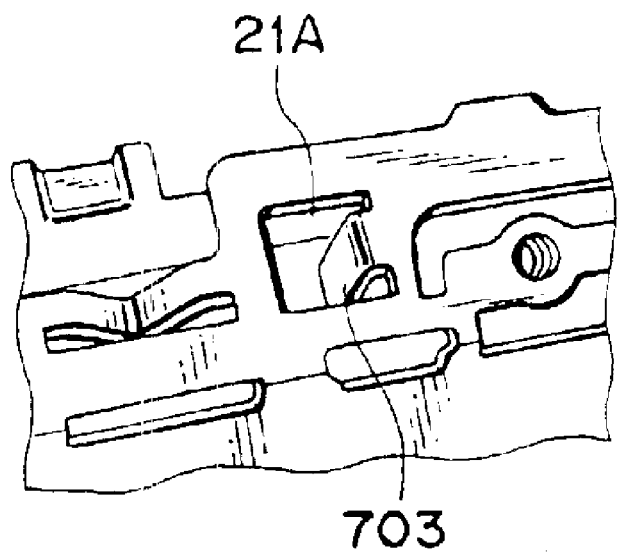
FIG. 19 is a perspective view showing a main part of a state where the eject plate illustrated in FIG. 17 is further assembled in a state of FIG. 16.

More specifically, the lower cover 70A comprises a main surface 700 and a pair of side walls 701 opposite to each other at both side ends of the main surface 700. The main surface 700 has a first swelled portion 702 which swells upwards at a front part thereof. On the other hand, the eject plate 21A has a first projection 215 which projects downwards at a front end thereof. As shown in FIG. 18, the first projection 215 is disposed on the first swelled portion 702 of the lower cover 701A with a little gap. In other words, while the eject plate 21A slidably moves, the first projection 215 moves on the first swelled portion 702 with the gap. On the other hand, the pair of side walls 701 of the lower cover 70A has a pair of side stoppers 703 formed by cutting and bending toward inner sides to each other. As shown in FIG. 19, the eject plate 21A slidably moves on the pair of side stoppers 703.

Inasmuch as the lower cover 70A is provided with the first swelled portion 702 and the pair of side stoppers 703 and the eject plate 21A is provided with the first projection 215, it is possible to prevent the eject plate 21A from warping, deforming, or the like caused by shock or the like.

Figure 20:
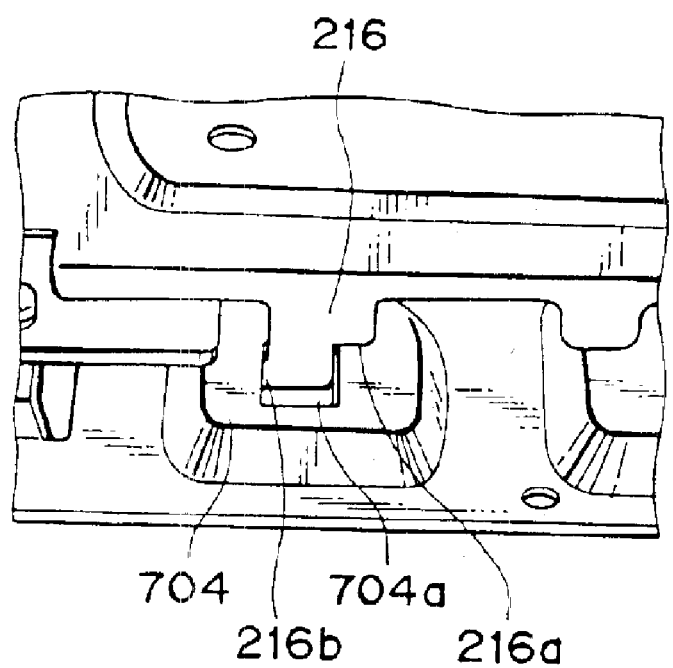
FIG. 20 is a perspective view showing a main part of a state where the eject plate illustrated in FIG. 17 is further assembled in a state of FIG. 16.
Figure 21:
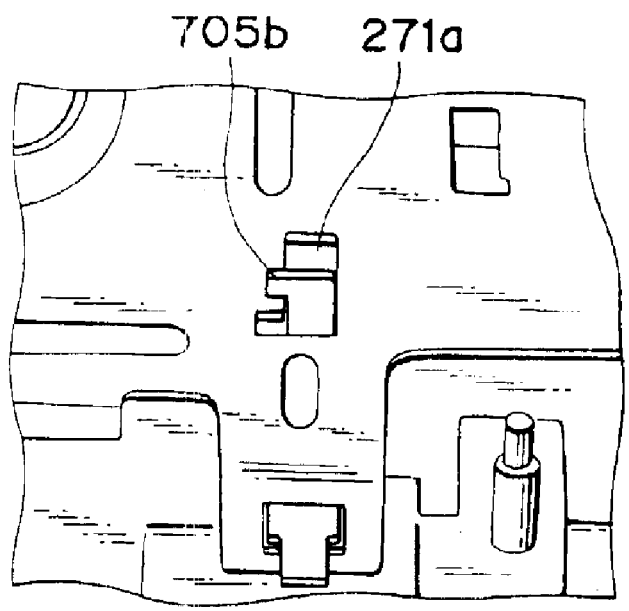
FIG. 21 is a perspective view showing a main part of a state where the eject plate illustrated in FIG. 17 is further assembled in a state of FIG. 16.

Referring to FIGS. 20 and 21 in addition to FIGS. 16 and 17, the description will proceed to the slide guide structure portions of the eject mechanism according to the embodiment of this invention.

Inasmuch as the structure of the front part of the frame is deleted from the main frame 13A in the manner which is described above, only two slide guides 136 are provided for the main frame 13A. Accordingly, it is necessary to provide with the slide guide structure portion of the eject mechanism to insufficient two places.

As shown in FIG. 16, the main surface 700 of the lower cover 70A has a second swelled portion 704 which swells upwards at a right-hand side of a center in the front part thereof. The second swelled portion 704 has an L-shaped opening 704a extending in the insertion direction A. On the other hand, as shown in FIG. 17, the eject plate 21A has a second projection 216 which projects downwards at the front end thereof. As shown in FIG. 20, the second projection 216 comprises a shoulder 216a in contact with the second swelled portion 704 of the lower cover 70A and an L-shaped hook portion 216a inserted in the L-shaped opening 704a. That is, a combination of the second swelled portion 704 and the second projection 216 constitutes one slide guide structure portion.

In addition, as shown in FIG. 17, the eject plate 21A has an L-shaped opening 217a extending in the insertion direction A at a right-hand front portion of a bottom surface thereof. On the other hand, as shown in FIG. 16, the main surface 700 of the lower cover 70A has a bent portion 705 formed by cutting and bending so as to project upwards at a right-hand front portion thereof. The bent portion 705 comprises a shoulder 705a in contact with a lower surface of the eject plate 21A and an L-shaped hook portion 705b inserted in the L-shaped opening 217a, as also shown in FIG. 21. That is, a combination of the L-shaped opening 217a of the eject plate 21A and the bent portion 705 constitutes another slide guide structure portion.

In the manner which is described above, according to the embodiment of this invention, a combination of the main frame 13A and the sub-frame of the lower cover 70A achieves a function as one frame.

While this invention has thus far been described in conjunction with a preferred embodiment thereof, it is to be understood that modifications will be apparent to those skilled in the art without departing from the sprit of the invention. For example, inasmuch as a slide guide structure portion is composed of a combination of an opening shape and a bent shape which are formed in an eject plate and a lower cover, it is possible to flexibly cope with by forming the opening shape in one side and by forming the bent shape in the other side.

What is claimed is:

1. A flexible disk drive comprising a main frame in which a flexible disk is inserted and a lower cover for covering a lower surface of said main frame, wherein said main frame has a size so as to mount a carriage assembly for holding a magnetic head, a stepping motor for slidably moving said carriage assembly along a predetermined radial direction, and a part substantially corresponding to a half of a spindle motor for rotatably driving said inserted flexible disk, said main frame having structure where a front portion of a frame is deleted; and said lower cover having a function as a sub-frame having a function corresponding to the front portion of said deleted frame, thereby playing a role as one frame by a combination of said main frame and said sub-frame of said lower cover.

2. A flexible disk drive as claimed in claim 1, wherein said lower cover comprising, as said sub-frame, a slide guide structure portion for an eject mechanism.

3. A flexible disk drive as claimed in claim 2, wherein said flexible disk drive further comprises, as one of parts of said eject mechanism, an eject plate held in said main flame slidably, said lower cover comprising a main surface and a pair of side walls opposite to each other at both side ends of said main surface, said main surface having a swelled portion which swells upwards at a front part thereof, said eject plate having a projection which projects downwards at a front end thereof, said projection being disposed on said swelled portion with a gap.

4. A flexible disk drive as claimed in claim 3, wherein said pair of side walls of said lower cover has a pair of side stoppers formed by cutting and bending toward inner sides to each other.

5. A flexible disk drive as claimed in claim 2, wherein said flexible disk drive further comprises, as one of parts of said eject mechanism, an eject plate held in said main flame slidably, said lower cover comprising a main surface and a pair of side walls opposite to each other at both side ends of said main surface, said main surface having a swelled portion which swells upwards at a front part thereof, said swelled portion having an L-shaped opening extending in an insertion direction, said eject plate having a projection which projects downwards at a front end thereof, said projection comprising a shoulder in contact with said swelled portion and an L-shaped hook portion inserted in said L-shaped opening, whereby a combination of said swelled portion and said projection constitutes a slide guide structure portion.

6. A flexible disk drive as claimed in claim 2, wherein said flexible disk drive further comprises, as one of parts of said eject mechanism, an eject plate held in said main flame slidably, said eject plate having an L-shaped opening extending in an insertion direction at a front portion of a bottom surface thereof, said lower cover comprising a main surface and a pair of side walls opposite to each other at both side ends of said main surface, said main surface having a bent portion formed by cutting and bending so as to project upwards at a front portion thereof, said bent portion comprising a shoulder in contact with a lower surface of said eject plate and an L-shaped hook portion inserted in said L-shaped opening, whereby a combination of said L-shaped opening and said bent portion constitutes a slide guide structure portion.

\* \* \* \* \*